(12) United States Patent
Watson et al.

(10) Patent No.: US 11,172,647 B2
(45) Date of Patent: Nov. 16, 2021

(54) SYSTEM AND METHOD FOR COUPLING AN EXERCISE WHEEL ACCESSORY TO A SMALL ANIMAL HABITAT

(71) Applicant: PetSmart Home Office, Inc., Phoenix, AZ (US)

(72) Inventors: Jeffrey Stocker Watson, Phoenix, AZ (US); Paul Tamulewicz, Glendale, AZ (US)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 152 days.

(21) Appl. No.: 16/567,985

(22) Filed: Sep. 11, 2019

(65) Prior Publication Data

US 2020/0100456 A1  Apr. 2, 2020

Related U.S. Application Data

(60) Provisional application No. 62/739,699, filed on Oct. 1, 2018.

(51) Int. Cl.
*A01K 1/03* (2006.01)
*A01K 15/02* (2006.01)

(52) U.S. Cl.
CPC .............. *A01K 1/03* (2013.01); *A01K 15/027* (2013.01)

(58) Field of Classification Search
CPC .. A01K 15/025; A01K 15/027; A01K 1/0245; A01K 1/032
See application file for complete search history.

(56) References Cited

U.S. PATENT DOCUMENTS

| | | |
|---|---|---|
| 1,425,166 A | 8/1922 | Bergmann |
| 3,020,601 A | 2/1962 | Stambaugh |
| 4,803,952 A | 2/1989 | Houser |
| 4,946,414 A | 8/1990 | Zimmer |
| 5,121,710 A | 6/1992 | Gonzalez |
| 5,890,338 A | 4/1999 | Rodriguez-Ferre |
| 7,241,198 B1 | 7/2007 | Boone |
| 9,901,076 B1* | 2/2018 | Tucker .................. A01K 15/02 |
| 2003/0213438 A1 | 11/2003 | Saxe et al. |
| 2007/0144046 A1 | 6/2007 | Hardt |
| 2008/0230012 A1* | 9/2008 | Woltmann ............. A01K 29/00 119/702 |

(Continued)

FOREIGN PATENT DOCUMENTS

| | | |
|---|---|---|
| CN | 201207848 Y | 3/2009 |
| CN | 202406749 U | 9/2012 |

(Continued)

*Primary Examiner* — Joshua J Michener
*Assistant Examiner* — Henry Hooper Mudd
(74) *Attorney, Agent, or Firm* — Fox Rothschild LLP

(57) ABSTRACT

A small animal habitat and a method for coupling an exercise wheel assembly to a small animal habitat. The small animal habitat includes a primary habitat portion, the primary habitat portion having a bottom portion, a central portion, and a top portion. The small animal habitat also includes an external hide structure coupled to the top portion of the primary habitat portion. An exercise wheel assembly is also provided, wherein the exercise wheel assembly is coupled to, and suspended from, the external hide structure. Additionally, a portion of the exercise wheel extends outside of the external hide structure.

9 Claims, 5 Drawing Sheets

(56) References Cited

U.S. PATENT DOCUMENTS

| | | | |
|---|---|---|---|
| 2011/0203527 A1* | 8/2011 | Willinger | A01K 1/03 119/472 |
| 2014/0144387 A1 | 5/2014 | Chang | |
| 2014/0196667 A1 | 7/2014 | Nicholls et al. | |
| 2015/0237822 A1 | 8/2015 | Jason | |

FOREIGN PATENT DOCUMENTS

| | | |
|---|---|---|
| CN | 204762697 U | 11/2015 |
| EP | 2333353 A2 | 6/2011 |
| KR | 20090074856 A | 7/2009 |

\* cited by examiner

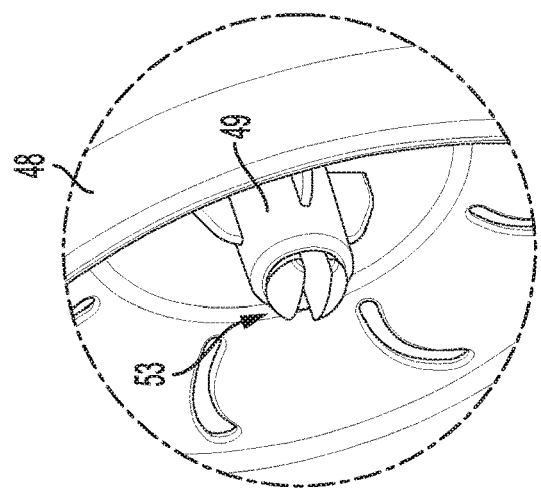
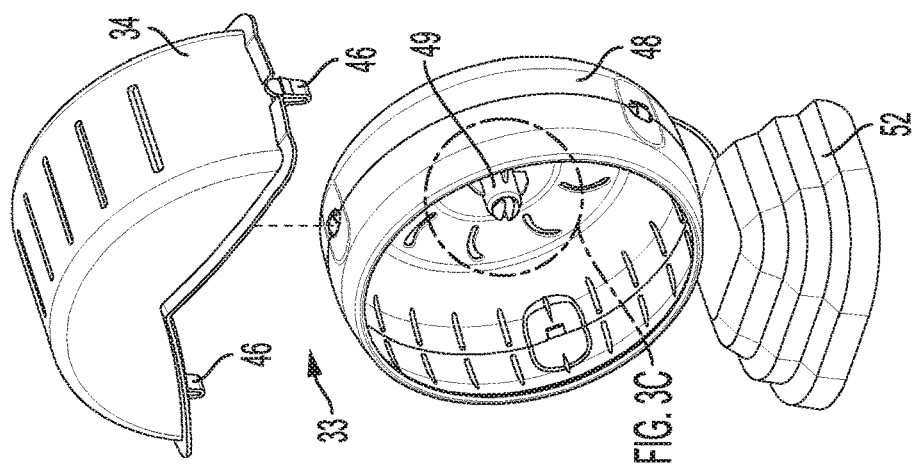
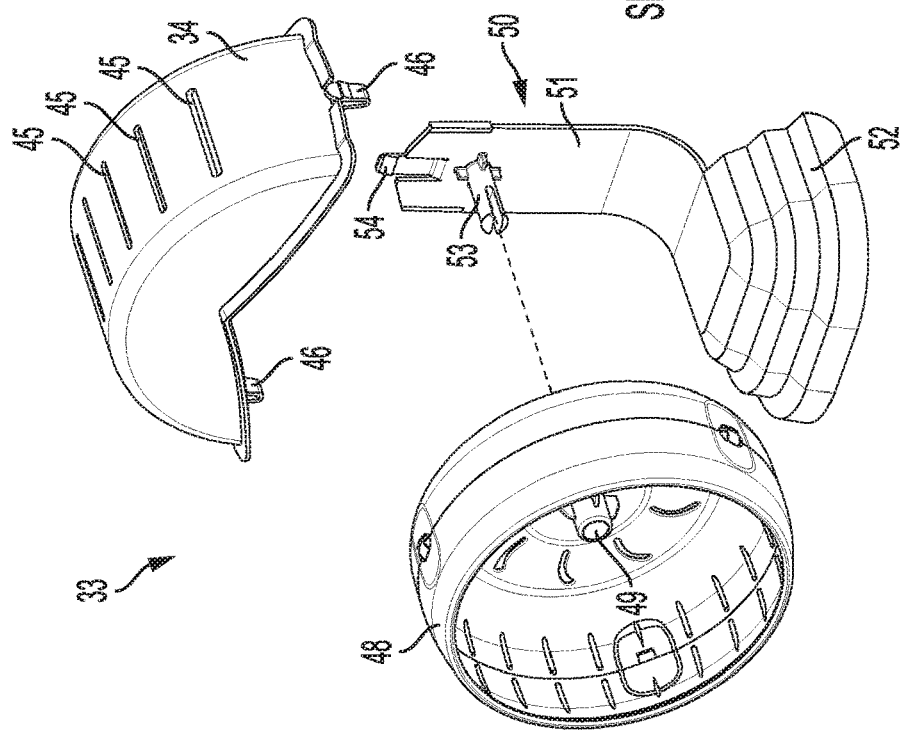

SYSTEM AND METHOD FOR COUPLING AN EXERCISE WHEEL ACCESSORY TO A SMALL ANIMAL HABITAT

RELATED APPLICATIONS AND CLAIM OF PRIORITY

This patent document claims priority to U.S. Provisional Patent Application No. 62/739,699, filed Oct. 1, 2018, the disclosure of which is fully incorporated into this document by reference.

BACKGROUND

The present disclosure relates generally to small animal habitats and, more particularly, to a system and method for coupling an exercise wheel to a small animal habitat.

Small animal habitats for housing pets such as, e.g., hamsters, gerbils, mice, rats, etc. are commonly found in many settings, and in an array of sizes and configurations. Generally, these habitats include multiple wall portions, a base portion, and a top portion, with at least one of the wall portions having a wire cage and/or one or more viewing windows to allow for visibility, airflow, etc. into the interior of the habitat. In some configurations, the top portion may form (or include) a lid, thereby allowing the pet owner to access the interior of habitat for cleaning, feeding, pet removal or replacement, etc. In other configurations, at least one of the top portion and the wall portions may have a door or hatch formed therein so as to allow owner access to the interior of the habitat.

Often, a pet owner may wish to include various accessories within the habitat, such as structures for hiding or sleeping, structures for exercise (e.g., exercise wheels), etc. Some structures, such as the hiding/sleeping structures, may simply be placed within the habit in an unattached manner. Other structures, such as exercise wheels, may be coupled to an interior base or wall portion. However, regardless of if or how the accessories are coupled to habitat, the small animal is still confined within the bounds of the habitat. Additionally, because the accessories are configured for use by the small animal entirely within the bounds of the habitat, the potential for the various accessories to be decorative and/or customizable is limited.

Accordingly, this patent document described devices that are intended to address the issues discussed above and/or other issues.

SUMMARY

In accordance with one aspect of the disclosure, a small animal habitat is disclosed. The small animal habitat may include a primary habitat portion, the primary habitat portion having a bottom portion, a central portion, and a top portion. An external hide structure may be coupled to the top portion of the primary habitat portion. Additionally, the small animal habitat may include an exercise wheel assembly, wherein the exercise wheel assembly is coupled to and suspended from the external hide structure, and further wherein a portion of the exercise wheel extends outside of the external hide structure.

According to another aspect of the disclosure, a method of coupling an exercise wheel assembly to a small animal habitat is disclosed. The method may include providing a primary habitat portion, the primary habitat portion having a bottom portion, a central portion, and a top portion. The method may also include providing an external hide structure, and coupling the external hide structure to the top portion of the primary habitat portion. Furthermore, the method may include providing an exercise wheel assembly, wherein the exercise wheel assembly has a base structure, a wheel, and a cover portion. The method may additionally include coupling the wheel to the base structure, coupling the base structure to the cover portion, and coupling the cover portion to the external hide structure.

BRIEF DESCRIPTION OF THE DRAWINGS

FIG. 3A is an exploded view of an exercise wheel assembly for use with the small animal habitat of FIG. 1;

FIG. 3B is a partially exploded view of the exercise wheel assembly of FIG. 3A;

FIG. 3C is a detail view of a rotary coupling interface of the exercise wheel assembly of FIG. 3A;

DETAILED DESCRIPTION

The following description is made for the purpose of illustrating the general principles of the present system and method and is not meant to limit the inventive concepts claimed in this document. Further, particular features described in this document can be used in combination with other described features in each of the various possible combinations and permutations.

Unless otherwise specifically defined in this document, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. Unless defined otherwise, all technical and scientific terms used herein have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used herein, the term "comprising" means "including, but not limited to". Additionally, use the term "couple", "coupled", or "coupled to" may imply that two or more elements may be directly connected or may be indirectly coupled through one or more intervening elements.

In this document, position-identifying terms such as "vertical", "horizontal", "front", "rear", "side", "top", and "bottom" are not intended to limit the invention to a particular direction or orientation, but instead are only intended to denote relative positions, or positions corresponding to directions shown when a small animal habitat or related component is oriented as shown in the Figures.

Figure 1:
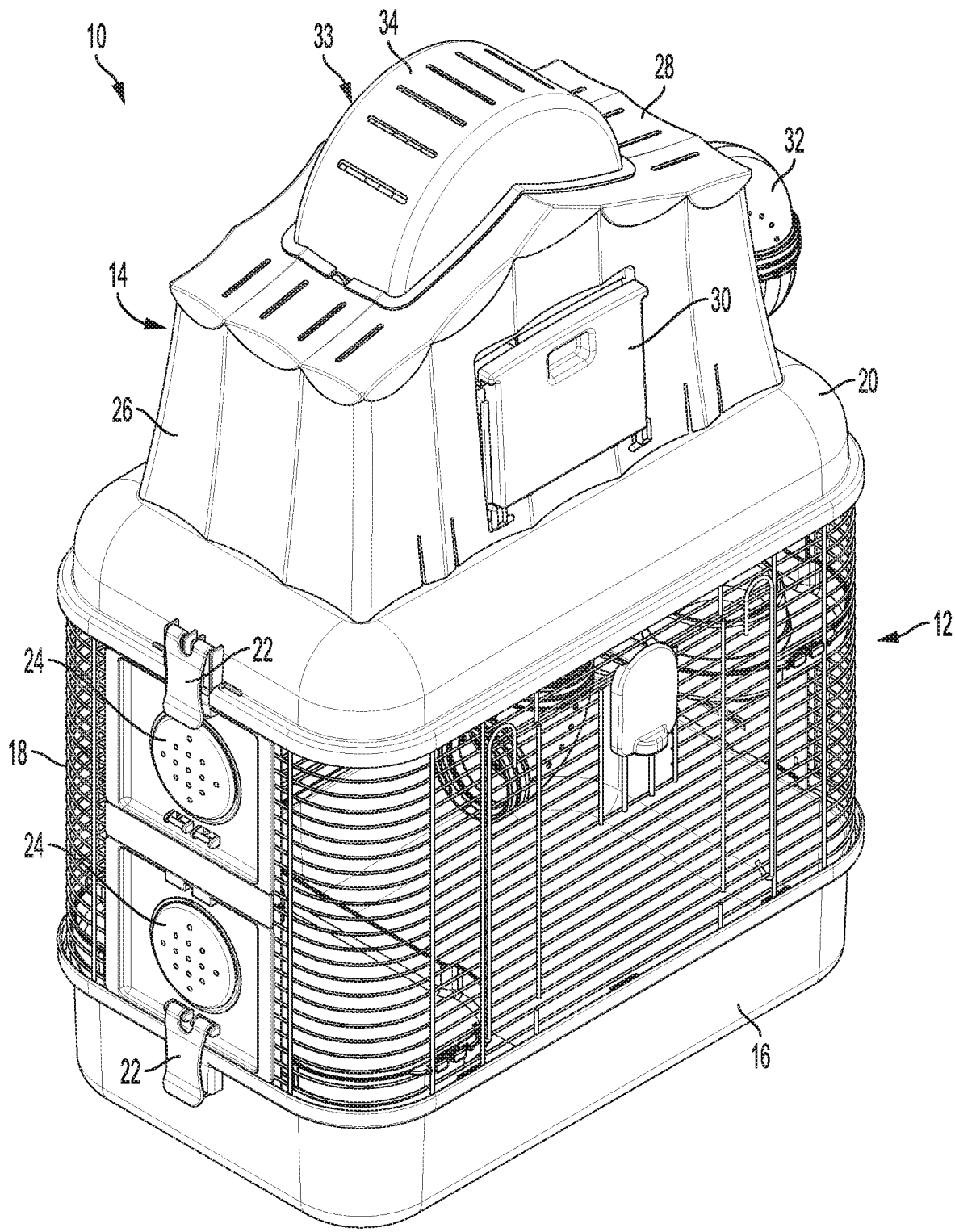
FIG. 1 is a perspective view of a small animal habitat in accordance with an aspect of the disclosure.

Referring to FIG. 1, a small animal habitat 10 in accordance with an aspect of the disclosure is shown. Small animal habitat 10 may be configured to hold any appropriate type of small animal, such as, e.g., one or more hamsters, gerbils, mice, rats, etc. Small animal habitat 10 may include a primary habitat portion 12, which may be cage-like in configuration and include therein bedding material for the animal, feeding accessories, one or more hide structures, etc. Specifically, the primary habitat portion 12 shown in FIG. 1 includes a base portion 16, a central portion 18, and a top portion 20. Central portion 18 may be formed of a plurality of closely-spaced wires so as to form the cage-like configuration. Alternatively, one or more walls of central portion 18 may be formed of a material other than wires, such as, e.g., clear or opaque plastic, etc.

One or both of base portion 16 and top portion 20 may be configured to be removably coupled to the central portion 18. For example, latches 22 may be provided so as to allow for selective removal of base portion 16 and/or top portion 20 from central portion 18, thereby allowing the user to easily access the interior of small animal habitat 10 in order to remove the small animal, clean the habitat, etc. While latches 22 are shown in FIG. 1 as being provided for removal of both the base portion 16 and the top portion 20, it is to be understood that primary habitat portion 12 may be configured such that only one of base portion 16 and top portion 20 is removable from central portion 18.

In addition to primary habitat portion 12, small animal habitat 10 further comprises an external hide structure 14. As shown in FIG. 1, external hide structure 14 may be coupled to top portion 20, thereby providing the small animal with additional location(s) in which to move within the small animal habitat 10. However, while external hide structure 14 is shown as being coupled to top portion 20, it is to be understood that the present disclosure is not limited as such, and an external hide structure may be coupled to the central portion 18 and/or base portion 16 in alternative embodiments.

As illustrated in FIG. 1, external hide structure 14 may also function to provide decorative embellishments to the small animal habitat 10. For example, external hide structure 14 in FIG. 1 is formed so as to resemble a tent (i.e., a circus tent), with a number of sidewalls 26 and a roof portion 28. It is to be understood that external hide structure 14 may be formed having decorative features other than those of a tent such as, e.g., a barn, a house, etc. In some embodiments, the sidewalls 26 and roof portion 28 are formed of multiple plastic components coupled together. However, the external hide structure 14 may be formed by other methods (i.e., a single molded structure) and/or of any appropriate material or combination of materials, thereby not being limited to formation by multiple plastic components. Additionally and/or alternatively, one or more of the sidewalls 26 and roof portion 28 may be formed so as to be clear, transparent, translucent, or opaque. Furthermore, in some embodiments, the external hide structure 14 may include a door 30, allowing the user to selectively access the interior of the external hide structure 14. The door 30 also be formed of any appropriate material (e.g., plastic), and may be clear, transparent, translucent, or opaque.

The small animal(s) housed within primary habitat portion 12 may move between primary habitat portion 12 and external hide structure 14 through a variety of possible means. For example, as will be set forth below with regard to FIG. 2, top portion 20 may include one or more openings formed therein, with the one or more openings coupled to a tube or other structure allowing the small animal(s) to access the interior of the external hide structure 14 from the primary habitat portion 12. Additionally and/or alternatively, one or more external tubes 32 may pass outside the primary habitat portion 12 and through one or more of the sidewalls 26 of the external hide portion 14. The external tubes 32 may couple to the primary habitat portion 12 at the location of one or more selectively-removable caps 24, thereby enabling the user to customize and/or modify the length, routing, etc. of the external tubes 32. Furthermore, the user may utilize other external tubes to couple the primary habitat portion 12 and/or the external hide structure 14 to other habitats or structures not shown in FIG. 1.

Referring still to FIG. 1, an exercise wheel accessory 33 is shown, with at least a portion of the exercise wheel accessory 33 extending at least partially above and outside of the external hide structure 14. More specifically, and as will be described in further detail below, a cover portion 34 of the exercise wheel accessory 33 is couplable to the roof portion 28, with cover portion 34 being configured to support all components of the exercise wheel accessory 33 such that the entire exercise wheel accessory 33 is suspended from the roof portion 28 of external hide structure 14. In some embodiments, cover portion 34 may be formed of a clear, transparent, or translucent material so as to allow the user to easily view a small animal utilizing the exercise wheel accessory 33.

Figure 2:
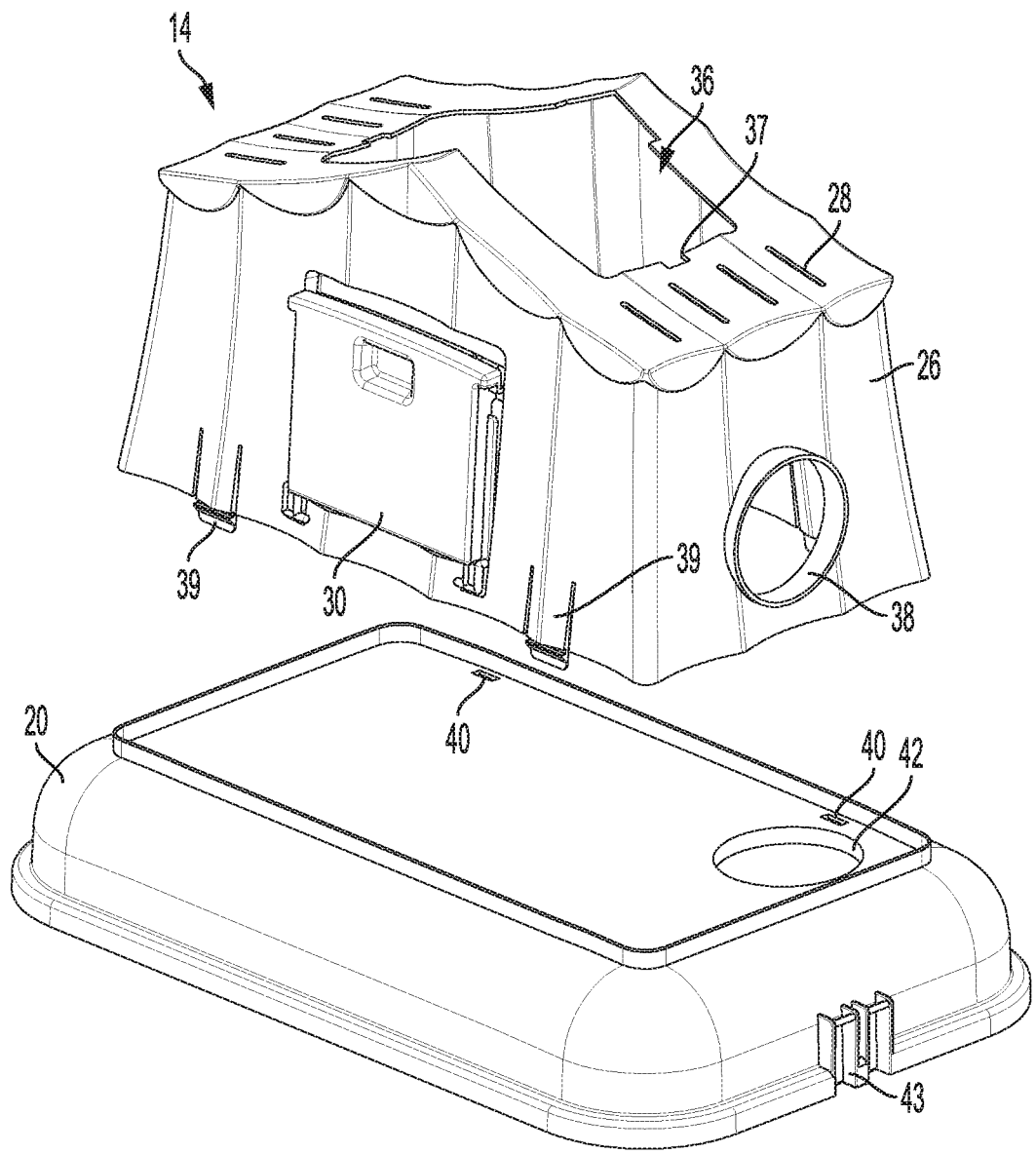
FIG. 2 is a perspective view of a top portion and external hide structure of the small animal habitat of FIG. 1.

Referring to FIG. 2, a partially-exploded view of external hide structure 14 and top portion 20 in accordance with an aspect of the disclosure is shown. As noted above, top portion 20 may include an opening 42 formed therein, which may provide access into an interior of the external hide structure 14 when external hide structure 14 is coupled to top portion 20. In that regard, external hide structure 14 may include a plurality of deflectable tabs 39 extending from a bottom portion thereof, wherein deflectable tabs 39 are configured to be coupled to a plurality of corresponding openings 40 formed within the top portion 20 so as to removably secure external hide structure 14 to the top portion 20. The top portion 20 may also include one or more latch mounts 43, which are configured to hold a latch 22 (shown in FIG. 1) so as to enable top portion 20 to be selectively removed and/or attached to the central portion 18, as described above. Furthermore, the external hide structure 14 may include at least one opening 38 formed therein, wherein opening 38 may be sized and configured to accept a tube (such as, e.g., external tube 32 shown in FIG. 1) to allow the small animal access into and/or out of external hide structure 14.

As is also shown in FIG. 2, the roof portion 28 of external hide structure 14 may also include an opening 36 formed therein, with opening 36 sized and shaped so as to accommodate the cover portion 34 of exercise wheel accessory 33. One or more notches 37 may be formed along the periphery of opening 36, with the one or more notches 37 being configured to accept a corresponding clip extending from the cover portion 34 so as to enable selective attachment of the cover portion 34 to the external hide structure 14, as will be described in further detail below.

Next, referring to FIGS. 3A-3C, various views of exercise wheel accessory 33 in accordance with another aspect of the disclosure are shown. Specifically, FIG. 3A illustrates an exploded view of exercise wheel accessory 33, which includes the cover portion 34, a wheel 48, and a base structure 50. As described above, the cover portion 34 may be formed of a clear, transparent, or translucent material so as to allow the user to easily view a small animal utilizing the exercise wheel accessory 33. Similarly, the wheel 48 may also be formed of a clear, transparent, or translucent material. Additionally, the cover portion 34 may include a plurality of slots 45 formed thereon, with slots 45 allowing for airflow and/or increased visibility into the external hide structure 14 when the cover portion 34 is coupled to the roof portion 28. Additionally, as described above, the cover portion 34 may comprise clips 46 extending therefrom, wherein the clips 46 are sized and configured so as to selectively engage with the notches 37 along opening 36 of the external hide structure 14, thereby securing cover portion 34 (and the entirety of exercise wheel accessory 33) to the roof portion 28 of external hide structure 14. The clips 46 may be deflectable such that each clip 46 may deflect inward as external hide structure 14 is inserted into the opening 36, with the clips 46 returning to a natural position upon full insertion into the respective notches 37 so as to engage the external hide structure 14 with the top cover 20. Conversely, to remove the external hide structure 14 from the top cover 20, the clips 46 may simply be deflected inward so as to disengage from the notches 37 of opening 36.

Referring still to FIGS. 3A-3C, the base structure 50 includes a platform 52, an arm 51 extending vertically from platform 52, and a post 53 protruding from arm 51. The base structure 50 may further include a vertically-extending clip 54 extending from arm 51. As will be set forth in more detail below with respect to FIGS. 4A-4B, the vertically-extending clip 54 may be utilized in order to releasably secure the cover portion 34 to the base structure 50.

As shown in FIG. 3C, post 53 may be split so as to have two deflectable end portions, with larger-diameter shoulder surfaces proximate the distal end of post 53. A hub 49 of the wheel 48 is sized so as to be slidable over post 53, deflecting the end portions and shoulder surfaces of post 53 inward upon installation. However, once hub 49 is fully installed on post 53, the deflectable end portions of post 53 return to a natural position, snapping outward such that the shoulder surfaces of post 53 laterally retain the wheel 48 on the base structure 50, while still allowing for full rotation of the wheel 48 about post 53.

Figure 4A:
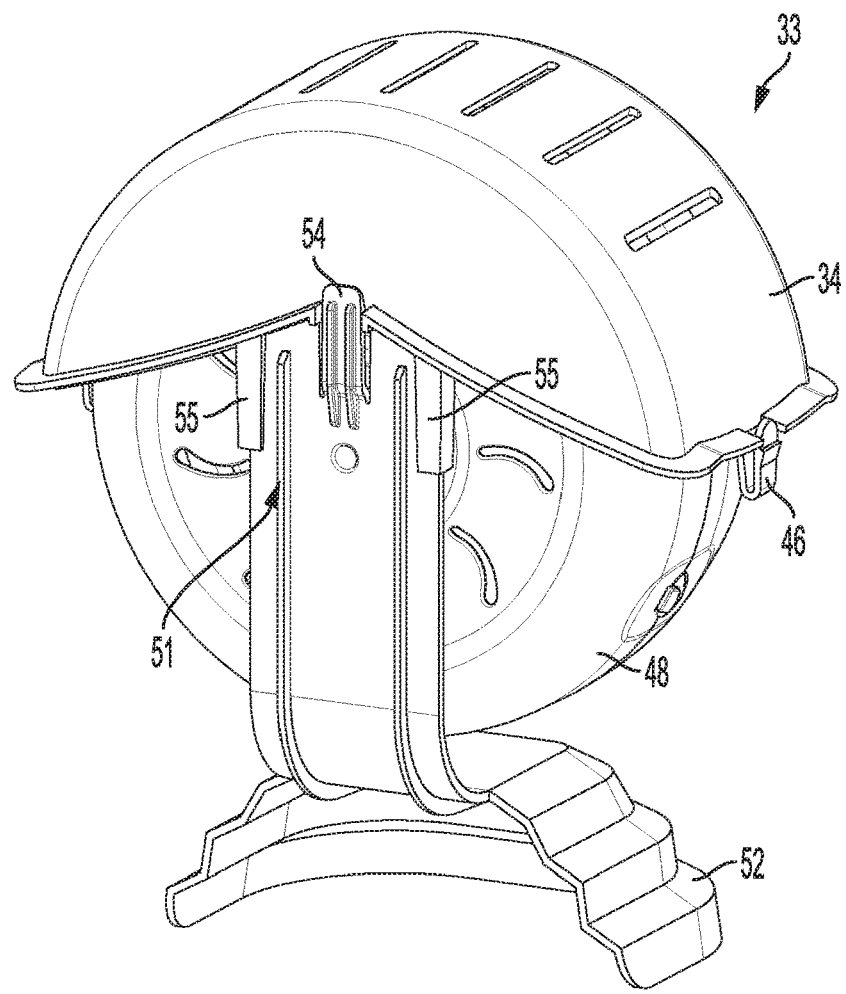
FIG. 4A is a rear view of the exercise wheel assembly in accordance with an aspect of the disclosure.
Figure 4B:
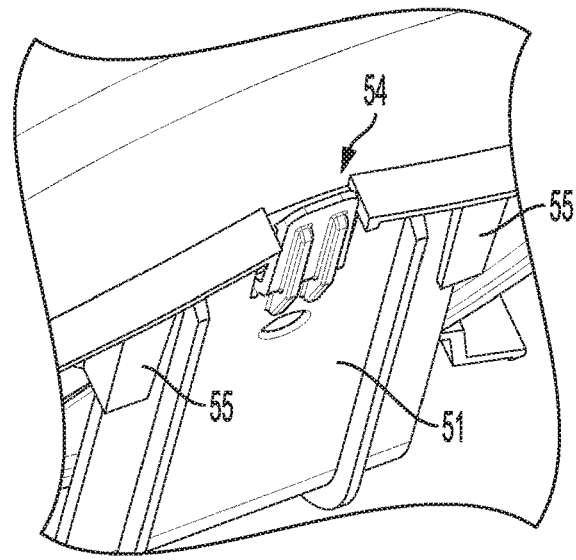
FIG. 4B is a detail view of a coupling interface of the exercise wheel assembly of FIG. 4A.

Referring to FIGS. 4A-4B, a rear view of the exercise wheel assembly 33 is shown. As described above, the vertically-extending clip 54 on arm 51 is configured to hold the cover portion 34 to the base structure 50. Additionally, the cover portion 34 may include a pair of downwardly-extending slide engagement members 55. The slide engagement members 55 may be sized and spaced so as to be engageable with lateral side portions of the arm 51. Thus, in addition to the vertically-extending clip 54 holding the cover portion 34 to the base structure 50, the slide engagement members 55 act to assist in supporting the cover portion 34 relative to the base structure 50.

Accordingly, with the configuration illustrated in FIGS. 3A-4B, exercise wheel assembly 33 may include a base structure 50, wheel 48, and cover portion 34, which may be coupled together so as to form single, connected assembly. In this way, exercise wheel assembly 33 may be supported by or upon the small animal habitat 10 in a variety of manners, including by way of suspension, as will be set forth in further detail below.

Figure 5A:
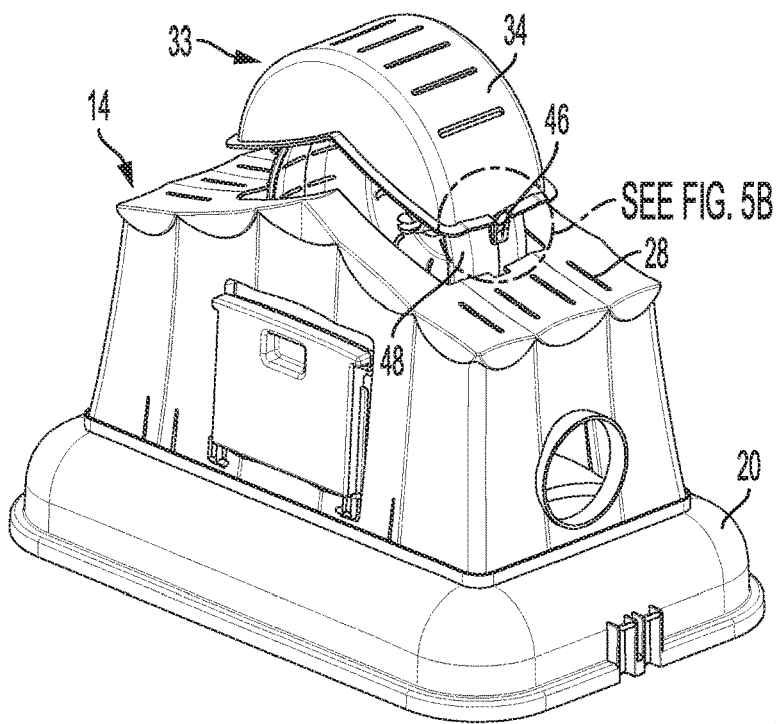
FIG. 5A is a partially exploded view of the exercise wheel assembly, top portion, and external hide structure of the small animal habitat in accordance with an aspect of the disclosure.
Figure 5B:
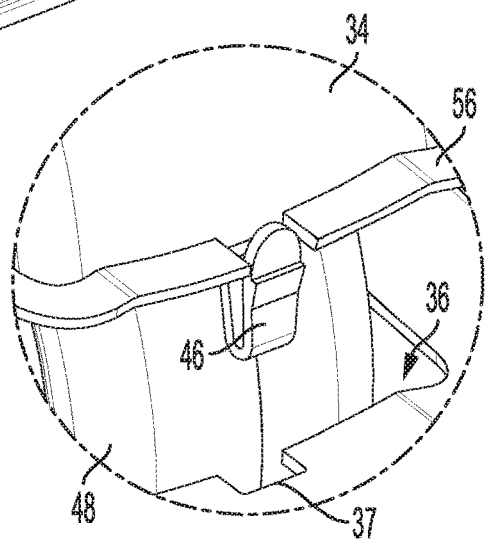
FIG. 5B is a detail view of a coupling interface of the exercise wheel assembly with the external hide structure of FIG. 5A.
Figure 5C:
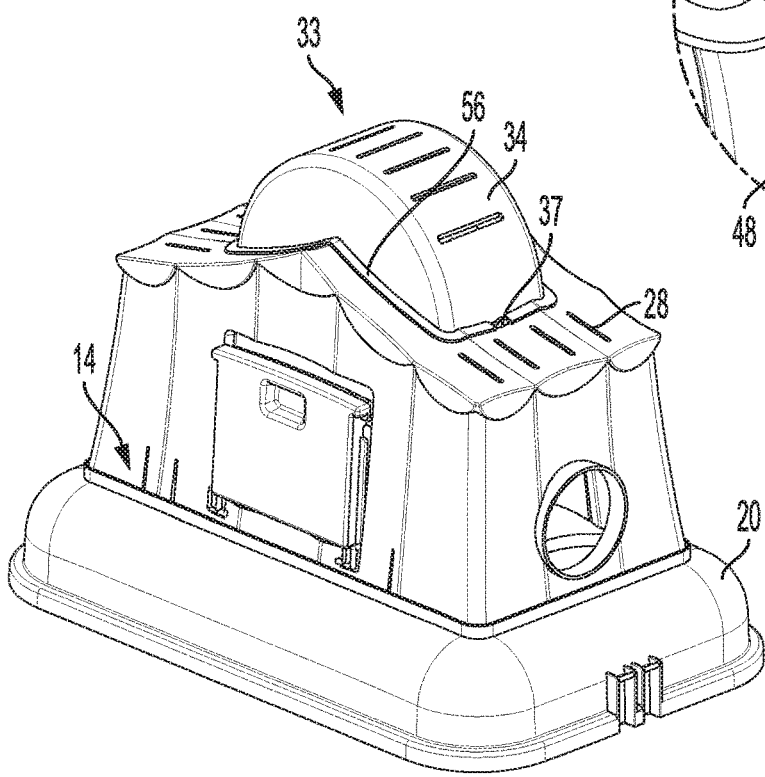
FIG. 5C is a perspective view of the exercise wheel assembly, top portion, and external hide structure of the small animal habitat in accordance with an aspect of the disclosure.

Referring to FIGS. 5A-5C, the suspended coupling of exercise wheel assembly 33 to external hide structure 14 in accordance with an aspect of the disclosure is shown. As is shown, the wheel 48 and base portion (not shown) may be at least partially inserted through the opening 36 formed in the roof portion 28 of external hide structure 14. The cover portion 34, however, is sized so as to fit over opening 36, with clips 46 of the cover portion 34 being configured to engage with the notches 37 of opening 36 so as to secure the cover portion 34 (and the overall exercise wheel assembly 33) to the roof portion 28. Additionally, the cover portion 34 may include a lip 56 extending substantially around a lower perimeter thereof, with lip 56 sized so as to fit around, and be larger than, opening 36, supporting the cover portion 34 upon the roof portion 28 of external hide structure 14. In this way, the exercise wheel assembly 33 may be suspended from, and extend at least partially outside of, the external hide structure 14 so as to provide greater visibility therein for the user, as well as providing a unique decorative appearance to the small animal habitat 10 and allow for external access to the exercise wheel assembly 33.

While the embodiments shown and described above with respect to FIGS. 1-5C disclose an exercise wheel assembly 33 that is suspended from the roof portion 28 of external hide structure 14, it is to be understood that exercise wheel assembly 33 may be supported in other ways, and that the hide structure 14 may be omitted entirely. For example, an opening similar to opening 36 described above may be formed in the top cover 20, with the exercise wheel assembly 33 being suspended from top cover 20 as opposed to roof portion 28. Accordingly, it is to be understood that the use of a suspended exercise wheel assemblies is not limited to small animal habits which include separable external hide structures.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the disclosure. The terminology used herein was chosen to best explain the principles of the embodiment, the practical application or technical improvement over technologies found in the marketplace, or to enable others of ordinary skill in the art to understand the embodiments disclosed herein.

What is claimed is:
1. A small animal habitat comprising:
    a primary habitat portion, the primary habitat portion comprising a bottom portion, a central portion, and a top portion;
    an external hide structure coupled to the top portion of the primary habitat portion and comprising at least one sidewall portion, and a roof portion having an opening formed therein; and
    an exercise wheel assembly comprising:
        a cover portion configured to be removably couplable to the roof portion of the external hide structure;
        a base structure comprising a platform, an arm extending vertically from the platform, a post protruding from the arm, and a vertically-extending clip extending from the arm and configured to couple the base structure to the cover portion; and
        a wheel rotatably couplable to the post;
    wherein the exercise wheel assembly is coupled to and suspended from the external hide structure, and further wherein a portion of the exercise wheel assembly extends outside of the opening in the external hide structure.

2. The small animal habitat of claim 1, wherein the cover portion comprises at least one deflectable clip extending therefrom, the at least one deflectable clip configured to selectively engage with at least one corresponding notch formed in the roof portion.

3. The small animal habitat of claim 1, wherein the cover portion comprises a lip extending around at least a portion of a lower perimeter of the cover portion, wherein the lip is sized so as to be larger than the opening formed in the roof portion.

4. The small animal habitat of claim 1, wherein the cover portion is formed of one of a clear, transparent, or translucent material.

5. The small animal habitat of claim 1, wherein at least one of the top portion and the bottom portion of the primary habitat portion is removably coupled to the central portion by at least one latch.

6. The small animal habitat of claim 1, wherein the top portion of the primary habitat portion comprises an opening formed therein, wherein the opening is configured to provide access between an interior of the primary habitat portion and an interior of the external hide structure.

7. The small animal habitat of claim 1, further comprising at least one external tube, wherein the at least one external tube is coupled to the primary habitat portion at a first end and the external hide structure at a second end so as to provide access between the interior of the primary habitat portion and the interior of the external hide structure.

8. A method of coupling an exercise wheel assembly to a small animal habitat, the method comprising:
providing a primary habitat portion, the primary habitat portion comprising a bottom portion, a central portion, and a top portion;
providing an external hide structure comprising at least one sidewall portion, and a roof portion having an opening formed therein;
coupling the external hide structure to the top portion of the primary habitat portion;
providing an exercise wheel assembly, wherein the exercise wheel assembly comprises:
a base structure comprising a platform, an arm extending vertically from the platform, a post protruding from the arm, and a vertically-extending clip extending from the arm;
a wheel; and
a cover portion;
rotatably coupling the wheel to the post of the base structure;
coupling the base structure to the cover portion by way of the vertically-extending clip; and
removably coupling the cover portion to the roof portion of the external hide structure.

9. The method of claim 8, wherein removably coupling the cover portion to the roof portion of the external hide structure comprises coupling the cover portion to the roof portion about the opening formed in the roof portion so as to suspend the exercise wheel assembly from the roof portion.

* * * * *